United States Patent Office

2,952,703
MANUFACTURE OF BENZOIC ACID

Charles H. McKeever, Meadowbrook, and Louis R. Freimiller, Philadelphia, Pa., assignors to Rohm & Haas Company, Philadelphia, Pa., a corporation of Delaware No Drawing. Filed July 31, 1958, Ser. No. 752,166

2 Claims. (Cl. 260—523)

This invention relates to an improved process for the manufacture of benzoic acid.

More specifically, this invention relates to an improved process for the manufacture of benzoic acid by the oxidation of acetophenone.

The preferred embodiments of this invention make possible the manufacture of substantially pure benzoic acids in high yields by the oxidation of acetophenone under mild oxidation conditions.

While it is well-known in the art that ketones in general can be oxidized to the corresponding carboxylic acids, the ease of oxidation of the different ketones varies appreciably. In addition, by-products are frequently produced, necessitating intensive purification steps if a pure carboxylic acid is required. Particularly if benzoic acid is to be used as a food preservative in the form of its sodium salt, a high degree of purity is required.

Acetophenone, being an arylalkyl ketone, exhibits anomalous chemical behavior, and, exhibits surprising resistance to oxidation under conditions under which other ketones would rapidly oxidize. A specific example is set forth in a publication by Sanders et al., Ind. Eng. Chem., 45, 2 et seq (1953) describing the synthesis of styrene by the air oxidation of ethylbenzene at 115° to 145° C. at 50 p.s.i. pressure in the presence of manganous acetate catalyst. Under these vigorous oxidizing conditions, the acetophenone produced as an intermediate in the production of styrene is quite stable, and only traces of benzoic acid can be isolated from the reaction mixture. Furthermore, it is well-known in the art that aliphatic ketones in general can be oxidized to the corresponding carboxylic acids in the presence of manganous acetate and carboxylic acid media excepting formic acid at temperatures of 30° C. to 60° C. Acetophenone, however, is substantially non-reactive under these conditions, and the amount of benzoic acid produced is negligible. It is also well-known that cobalt acetate can generally be substituted for the manganous acetate catalyst. We have found that cobalt acetate is completely ineffective as an oxidation catalyst for acetophenone.

Whitmore, "Organic Chemistry" (D. Van Nostrand Co., Fifth Edition, 1942), page 796, describing the reactions of acetophenone, states as follows:

"Vigorous oxidation converts acetophenone to benzoic acid. Controlled oxidation with cold alkaline $KMnO_4$ attacks only the methyl group giving PhCOCOOH, phenylglyoxylic acid (benzoylformic acid)."

Surprisingly, we have found that acetophenone can be rapidly air oxidized to substantially pure benzoic acid in high yields if the reaction conditions described hereinafter obtain, this despite the fact that the oxidizing conditions employed are relatively mild.

The process of the present invention comprises heating a reaction mixture comprising acetophenone, manganous acetate and a monocarboxylic alkanoic acid, except formic acid, while maintaining the reaction mixture in an oxygen saturated condition throughout the heating period.

The control of the temperature of the reaction mixture is particularly critical. The active oxidation catalyst in this reaction is characterized by a dark brown color and it decomposes when heated above 107° C. to give a yellow-orange reaction mixture which is completely inactive and will not react further with oxygen. Surprisingly, the same phenomenon occurs when the temperature falls below 80° C. Thus, the only operative temperature range is from 80° C. to 107° C., the preferred being 83° to 97° C.

Manganous salts of lower monocarboxylic alkanoic acids, that is, with 2 to 4 carbon atoms, appear to be specific catalysts for this reaction and either the anhydrous or the hydrated form may be employed. The commercially available manganous acetate tetrahydrate is employed in the preferred embodiment of the present invention. The amount of manganous acetate required can be varied appreciably with about 0.7 to 3.5% by weight of the acetophenone being normally effective. Preferred quantity is from 1% to 2% by weight of the acetophenone, since these percentages are expressed on the basis of anhydrous manganous acetate, correction must obviously be made for the water of hydration when employing the manganous acetate tetrahydrate. While it is possible to use higher amounts of manganous acetate than those above cited, no advantage appears to be gained thereby.

For some reasons yet unexplained, formic acid cannot be employed as the monocarboxylic alkanoic acid. Suitable monocarboxylic alkanoic acids are those containing 2 to 8 carbon atoms, either straight or branched chain acids being suitable. Since benzoic acid boils at 249° C., monocarboxylic alkanoic acids boiling appreciably below 249° C. are preferred because of ease of purification of the benzoic acids by distillation of the formic acid by-product and the alkanoic acid from the benzoic acid. Thus, lower alkanoic acids, that is, with 2 to 4 carbon atoms, are preferred, typical of which are acetic and propionic. The amount of monocarboxylic alkanoic acid employed in the reaction mixture may be varied over wide limits, but it is understood that the preferred embodiment employs a minimum of 1.0 mole of monocarboxylic alkanoic acid per mole of acetophenone in the reaction mixture. While excesses can be employed, there does not seem to be any real advantage obtained thereby, and the purification of the benzoic acid is made somewhat more time-consuming as a result of any excess alkanoic acid employed.

Partial oxidation of acetophenone can be effected using even less than one mole of monocarboxylic alkanoic acid per mole of acetophenone. However, under these conditions, the degree of conversion of the acetophenone is relatively low since the reaction stops due to inactivation of the catalyst. A minimum of one mole of monocarboxylic alkanoic acid per mole of acetophenone is the preferred embodiment since high conversion and high yields are thereby obtained.

It has also been surprisingly found that it is possible to reduce substantially the quantity of monocarboxylic alkanoic acid required by using the reduced amount of alkanoic acid in conjunction with a small amount of nitric acid. This is a completely unexpected result, and does not appear to depend on the oxidative action of nitric acid. It is well-known from the prior art that large excesses of nitric acid must be employed when using nitric acid as the oxidant in an oxidation reaction. Nor does it appear to depend solely on the increased acidity brought about by the addition of the nitric acid since both sulfuric and phosphoric acids were inoperative under the same conditions. Thus, while a minimum of one mole of monocarboxylic alkanoic acid is required for high conversion and good yields, when employing said alkanoic acid as the sole acid, as little as one-third of a mole of alkanoic acid can be effectively employed with high conversion and yields comparable to the use of one mole of said alkanoic acid if the decreased quantity of alkanoic is used in conjunction with as little as 0.075 mole of nitric acid. This sizable decrease in alkanoic acid requirements not only effects appreciable economies, but also makes possible higher space-time yields of benzoic acid. A comparison of the process of this invention which uses a monocarboxylic alkanoic acid as the sole acid with the process employing a reduced amount of monocarboxylic alkanoic acid in the presence of nitric acid is shown hereinafter.

It is very important that the reaction mixture be oxygen saturated at all times since the active catalyst for this reaction, characterized by a dark brown color, decomposes when an inadequate supply of oxygen is maintained in contact with the reaction mixture. Thus, the oxygen should be supplied by a sparger device, and adequate mixing must be maintained so that all parts of the reaction mixture remain oxygen saturated. Once the catalyst has been inactivated as, for instance, by improper temperature control or inadequate oxygen, the catalyst cannot be reactivated until all of the formic acid has been removed from the reaction mixture. Particularly when using the lower alkanoic acids, this means that an appreciable amount of these acids will be carried over during removal of the formic acid. Air may be satisfactorily employed for the source of oxygen for the oxygen saturation, but, as might be expected, the oxidation reaction proceeds appreciably faster if oxygen is employed.

The numerous uses of benzoic acid are well-known to those skilled in the art. One important use for which benzoic acid with the purity obtained by this process is particularly suitable is the conversion of it to its sodium salt, said sodium salt being widely used as a food preservative.

The following examples set forth certain well-defined instances of the application of this invention. They are not, however, to be considered as limitations thereof, since many modifications may be made without departing from the spirit and scope of this invention.

Unless otherwise specified, all parts are parts by weight.

Example I

A mixture of 120 grams (1 mole) of acetophenone, 90 grams (1.5 moles) of acetic acid, and 3.4 grams of manganous acetate tetrahydrate was stirred rapidly and a stream of oxygen was passed into the mixture. The mixture was heated to 80° C. to 82° C. at which temperature the mixture became dark brown and oxygen adsorption began. The temperature of the system was held at 92° C. to 97° C. throughout the course of the reaction. After three and one-half hours, when oxygen was no longer absorbed, the mixture was heated to 105° to 110° C. for a few minutes and then the formic acid formed during the reaction and acetic acid were removed by distillation. The residue was diluted with 500 ml. of water and this mixture was steam distilled to remove traces of unreacted acetophenone. The residue was again cooled and the benzoic acid which crystallized was collected on a filter and dried. Yields of benzoic acid=108 grams (89%). Melting point=118° to 121° C. Purity=98% to 99% benzoic acid.

Example II

Into a reaction flask were placed 1920 grams (16 moles) of acetophenone, 320 ml. (5.6 moles) of acetic acid, 48 ml. (1.15 moles) of nitric acid, and 54.4 grams of manganous acetate tetrahydrate. This mixture was stirred rapidly and oxygen was passed in while the mixture was being heated to 85° to 87° C. When this temperature range was reached, reaction started immediately and oxygen was absorbed at a maximum rate of 2.5 to 2.6 liters per minute. The mixture was maintained at 85° to 87° C. throughout the course of the reaction. Cooling was necessary at first, but toward the end of the reaction, heating was used. The total reaction time was eight and one-half hours and after this time, oxygen was no longer absorbed. The reaction mixture was cooled somewhat, placed under 20 mm. pressure and all the formaldehyde and formic acid formed in the reaction and acetic acid were removed by distillation. The residue was treated with 3.6 liters of water. This mixture was steam distilled to remove traces of acetophenone. This solution was cooled to room temperature and the benzoic acid which crystallized was collected on a filter and dried in an oven. Yield of benzoic acid=1748 grams (89.5%) based on acid number determination. Melting point=114° to 120° C.

By treating the aqueous filtrate with ether and then extracting the ether solution with sodium hydroxide, an additional 22 grams of benzoic acid and 7 grams of acetophenone were recovered.

The original strippings were carefully distilled and as a residue from this distillation was obtained 22 grams of acetophenone and 3.7 grams of benzoic acid.

Example III

The 48 ml. of nitric acid of Example II was replaced with 1056 ml. of additional acetic acid and the reaction carried out as set forth in Example II. Comparable results were obtained.

Example IV

The oxygen supply of Example II was replaced with air pressured to 20 p.s.i. While the yield of benzoic acid and the purity of the product were equivalent to the results obtained in Example II, the running time required was about 50% longer.

Example V

Into a reaction flask equipped with an efficient stirrer, a gas inlet tube, and a condenser was charged 120 grams (1 mole) of acetophenone, 90 grams (1.22 mole) of propionic acid, and 3.4 grams manganous acetate tetrahydrate. Stirring was started and oxygen at a rate of 500 ml./minute was passed into the mixture. Heat was applied and when the temperature reached 80° C. the reaction mixture turned dark brown and oxygen absorption began. The heat source was removed. The temperature was allowed to rise to 94° C. and maintained at 94° to 96° C. by applying cooling when necessary. After about three hours, the rate of oxygen absorption had noticeably decreased and it was again necessary to apply heat to maintain a temperature of 94° C. After four hours, the oxygen absorption had become negligible. The mixture was heated to 105° to 110° C. for 5 to 15 minutes and then the propionic acid and formic acid formed during the reaction was removed by distillation. The residue was treated as in Example I. The yield of benzoic acid was 112 grams (92%), melting point 119° to 121° C., purity 98.5 to 99.5%.

We claim:

1. A process for producing benzoic acid by the oxidation of acetophenone which comprises introducing oxygen into a reaction mixture comprising acetophenone, manganous acetate, said acetate being present in a quantity from about 0.70% to about 3.5% of the weight of the acetophenone, about one-third mole of a monocarboxylic alkanoic acid containing 2 to 4 carbon atoms per mole of acetophenone and about 0.075 mole of nitric acid per mole of acetophenone, heating to a temperature of from about 80° C. to about 107° C., and maintaining said reaction mixture in an oxygen saturated condition at said temperature.

2. A process as set forth in claim 1 in which said monocarboxylic alkanoic acid is acetic acid.

References Cited in the file of this patent
UNITED STATES PATENTS

| | | |
|---|---|---|
| 2,245,528 | Loder | June 10, 1941 |
| 2,316,543 | Amend | Apr. 13, 1943 |
| 2,673,217 | Hull | Mar. 23, 1954 |